United States Patent
Nakada et al.

(10) Patent No.: US 8,509,335 B2
(45) Date of Patent: Aug. 13, 2013

(54) ARRAY ANTENNA APPARATUS AND MICRO WAVE TRANSCEIVER MODULE

(75) Inventors: Taihei Nakada, Kawasaki (JP); Junichiro Suzuki, Kawasaki (JP); Yoshiaki Satake, Kawasaki (JP); Hiroyuki Uwamichi, Kawasaki (JP); Madoka Uwamichi, legal representative, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 485 days.

(21) Appl. No.: 12/720,157

(22) Filed: Mar. 9, 2010

(65) Prior Publication Data

US 2010/0265998 A1    Oct. 21, 2010

(30) Foreign Application Priority Data

Mar. 10, 2009   (JP) ................................ 2009-056923

(51) Int. Cl.
    *H04B 7/02*      (2006.01)

(52) U.S. Cl.
    USPC ........................................................ 375/267

(58) Field of Classification Search
    USPC ........................................................ 375/267
    See application file for complete search history.

(56) References Cited

U.S. PATENT DOCUMENTS

| | | | |
|---|---|---|---|
| 6,694,154 B1 * | 2/2004 | Molnar et al. | 455/562.1 |
| 7,193,544 B1 * | 3/2007 | Fitelson et al. | 341/143 |
| 2007/0263564 A1 * | 11/2007 | Hansen et al. | 370/328 |
| 2009/0102927 A1 * | 4/2009 | Tatsuta et al. | 348/192 |

FOREIGN PATENT DOCUMENTS

| | | |
|---|---|---|
| JP | 2000-98020 | 4/2000 |
| JP | 2007-155741 | 6/2007 |

* cited by examiner

*Primary Examiner* — Daniel Washburn
*Assistant Examiner* — Wednel Cadeau
(74) *Attorney, Agent, or Firm* — Oblon, Spivak, McClelland, Maier & Neustadt, L.L.P.

(57) ABSTRACT

In a transceiver module, a micro wave analog signal interface is provided between the transceiver module and an antenna element, and all the signal interfaces except a power supply are digital signal interfaces, and the interfaces are configured as one chip on a semiconductor. An internal reference signal generates a local signal serving as a reference by multiplying a high frequency digital clock signal supplied from the outside, and simultaneously generates a reference signal capable of synchronous operation by a lower frequency digital clock signal supplied from the outside, in the clock generator. The frequency of the generated reference local signal can be varied by controlling the inner multiplication number or the frequency of the higher frequency digital clock signal supplied from the outside. In addition, both transmission and reception can be executed with an arbitrary frequency by varying the frequency of the transmission waveform generator.

13 Claims, 2 Drawing Sheets

ARRAY ANTENNA APPARATUS AND MICRO WAVE TRANSCEIVER MODULE

CROSS-REFERENCE TO RELATED APPLICATIONS

This application is based upon and claims the benefit of priority from prior Japanese Patent Application No. 2009-056923, filed Mar. 10, 2009, the entire contents of which are incorporated herein by reference.

BACKGROUND OF THE INVENTION

1. Field of the Invention

The present invention relates to an array antenna apparatus used for, for example, a radar apparatus, a radio communication device, etc, to transmit and receive a high frequency signal of a micro wave band, and a micro wave transceiver module used for the array antenna apparatus and, more particularly, to technology of implementing pattern synthesis in transmission and reception of a plurality of antenna elements by means of digital synthesis.

2. Description of the Related Art

On an antenna apparatus used for a radar apparatus, a radio communication device, etc, to transmit and receive a high frequency signal of a micro wave band, a request for phased array has been increased for high function and high performance.

However, since the phased array needs a number of antenna elements, a number of micro wave transceiver modules connected to the antenna elements, respectively, a power supply a control circuit, etc, which operates it, the apparatus configuration is complicated at a large scale. Furthermore, the phased array also needs a power amplifier, micro wave semiconductor elements such as a phase shifter, a switch, etc, a specific circuit such as a micro wave signal distributing/synthesizing circuit connected to each of the micro wave transceiver modules to execute pattern synthesis of the array antenna. Thus, downsizing and reduction in manufacturing costs are difficult.

Incidentally, technology of circuit integration of an RF transceiver module used for a radar sensor, etc. is disclosed in, for example, Jpn. Pat Appln. KOKAI publication No, 2007-155741.

BRIEF SUMMARY OF THE INVENTION

An object of the present invention is to provide an array antenna apparatus and a micro wave transceiver module used for the array antenna apparatus which a radio frequency circuit part of a micro wave transceiver module, a power synthesizing circuit, etc. is digitized, and the whole is small hereby, and is cheap.

The array antenna apparatus of the present invention comprises: a plurality of antenna elements; a plurality of micro wave transceiver modules connected to the plurality of antenna elements, respectively, having a function of supplying transmission micro wave signals to the antenna elements and a function of receiving micro wave signals from the antenna elements; a beam former configured to synthesize reception signals output from the plurality of micro wave transceiver modules; and an antenna controller configured to generate a control signal to each of the plurality of micro wave transceiver modules and the beam former, wherein each of the micro wave transceiver modules comprises an interface for inputting/outputting a micro wave analog signal to/from the antenna element, and all of signal interfaces except a power supply are digital signal interfaces and are configured as one chip on a semiconductor.

The micro wave transceiver module of the present invention connected to each of a plurality of antenna elements, supplying transmission a micro wave signal to the antenna element and receiving a micro wave signal from the antenna element, the micro wave transceiver module comprises: a waveform generator capable of generating different transmission waveforms for the respective antenna elements; a clock generator configured to generate a reference local signal by multiplying a higher frequency digital clock signal, and generate a reference signal for synchronization from a lower frequency digital clock signal; a digital signal-analog signal (DA) converter configured to convert the digital transmission signal generated in the waveform generator into an analog signal; a transmission signal mixer configured to mix the higher frequency reference local signal generated in the clock generator with the analog transmission signal generated in the DA converter and generate a micro wave transmission signal; a transmission power amplifier configured to execute power amplification for the transmission signal frequency-converted in the mixer and transmit the transmission signal to the antenna element; a reception power amplifier configured to execute low heat noise amplification for the reception micro wave signal input from the antenna element; a reception signal mixer configured to mix the reference local signal generated in the clock generator with the micro wave reception signal output from the reception power amplifier, and generate a reception intermediate frequency signal; an analog signal-digital signal (AD) converter configured to convert the analog signal of the reception intermediate frequency signal generated in the reception signal mixer, into a digital signal, with the reference local signal generated in the clock generator; and a module controller configured to control at least the digital waveform generator and the clock generator in accordance with directions from outside, wherein the micro wave transceiver module comprises an interface for inputting/outputting a micro wave analog signal to/from the antenna element, and all of signal interfaces except a power supply are digital signal interfaces and are configured as one chip on a semiconductor.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below with reference to the accompanying drawings.

Figure 1:
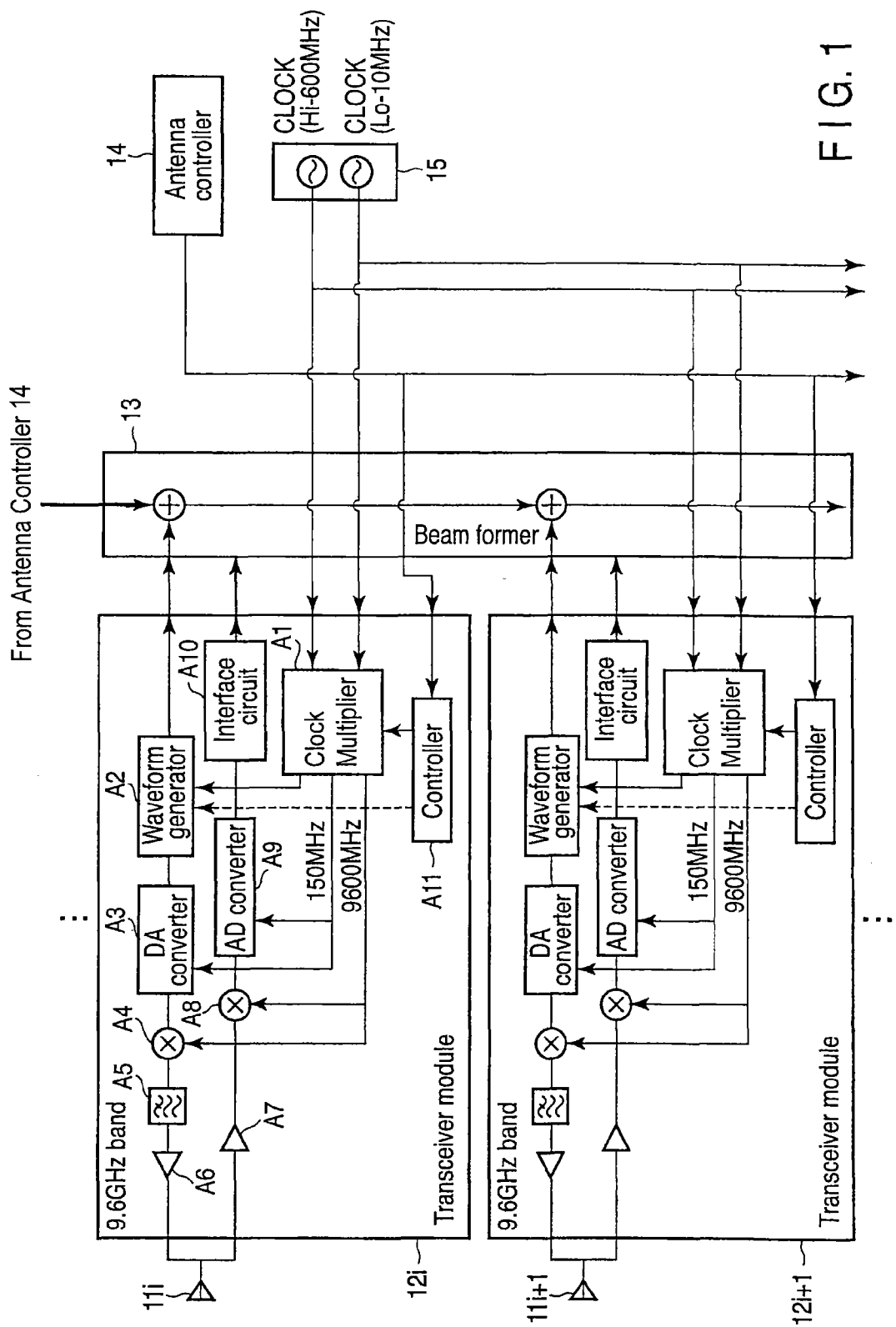
FIG. 1 is a block diagram showing a structure of a micro wave array antenna apparatus according to an embodiment of the invention.

FIG. 1 is a block diagram showing a structure of a micro wave array antenna apparatus according to an embodiment of the present invention. A high frequency digital clock signal is set at Hi=600 MHz and Lo=10 MHz, and a 9.6 GHz-band transmission signal is generated and output.

In FIG. 1, . . . , 11*i*, 11*i*+1, . . . (hereinafter 11*n*) represent antenna elements. The antenna elements 11*n* are connected to transceiver modules . . . , 12*i*, 12*i*+1, . . . (hereinafter 12*n*) provided to correspond thereto, respectively, to input and output transmission and reception signals through the modules 12*n*. Each of the transceiver modules 12*n* generates a transmission signal with a digital clock signal fed from a signal source 15, forms a bean by controlling weight of amplitude and phase characteristic of a reception signal from the antenna element 11*n*, and outputs the reception signal subjected to the control to a beam former 13.

In the transceiver module 12*n*, a clock generator A1 generates a reference signal having a baseband frequency of 150 MHz and a reference local signal having a transmission frequency of 9600 MHz from the digital clock signal (Hi=600 MHz, Lo=10 MHz) supplied from the signal source 15. A waveform generator A2 generates a digital signal of a transmission waveform from the reference signal having the baseband frequency of 150 MHz generated by the clock generator A1. A DA converter A3 converts the digital signal of the transmission waveform generated by the waveform generator A2 into an analog signal. A transmission signal mixer A4 mixes the reference local signal of the transmission frequency with the analog transmission signal of the baseband output from the DA converter A3 and upconverts the mixed signal. A filter A5 removes an unnecessary frequency component generated at the time of upconverting. A transmission power amplifier A6 amplifies the transmission signal output from the filter A5 in terms of power and outputs the amplified transmission signal to the antenna element 11*n*.

In addition, a reception power amplifier A7 executes low noise amplification for the reception output of the antenna element 11*n*. A reception signal mixer A8 mixes the output of the reception power amplifier A7 with the reference local signal of the transmission frequency and converts the output into an IF (intermediate frequency) band. An AD converter A9 converts the output of the reception signal mixer A8 into a digital signal of the baseband. A signal interface circuit unit A10 converts the reception signal converted into the digital signal of the baseband, in a predetermined format, and outputs the signal to the beam former 13. A module controller A11 arbitrarily controls the timing and the parameter of each of the processors A1 to A10 in accordance with a control signal from an antenna controller 14.

The transmission waveform signal generated by the waveform generator A2 and the reception signal obtained by the signal interface circuit unit A10, in the above-constituted transceiver module 12*n*, are fed to the beam former 13. The beam former 13 monitors the amplitude and the phase of the signal from each transceiver module 12*n*, and adjusts parameters to adjust the width and the angle of each of a transmission beam and a reception beam.

Characteristic portions of the invention in the above-described configuration will be described below.

First, the original waveform of the signal in the transmission is generated in the waveform generator A2. The original waveform of the transmission signal is, for example, a chirp waveform which executes frequency sweep in the transmission pulse, at a radar, etc. In the waveform generator A2, the original waveform F0 is first generated.

Next, a general two-dimensional element arrangement array antenna is assumed and explained.

In this case, a digital transmission signal is generated by adding phase delay amount Pm,n obtained from frequency fc to the original waveform and also adding amplitude modulation Am,n as needed where coordinates of each antenna element are (Xm,n, Ym,n, Zm,n), a beam directivity angle in the direction of azimuth is $\theta_{AZ}$, and a beam directivity angle in the direction of elevation angle is $\theta_{EL}$.

The phase delay amount Pm,n of each of the antenna elements can be obtained by the following equation (1) in the case of the general two-dimensional element arrangement array antenna.

$$Pm,n = 2\pi/Vc \times (Xm,n \times \cos(\theta_{EL}) \times \sin(\theta_{AZ}) + Ym,n \times \sin(\theta_{EL})) \quad (1)$$

Vc: light velocity
Xm,n: X-axis coordinate of each antenna element
Ym,n: Y-axis coordinate of each antenna element
θm,n: beam scanning angle in direction of azimuth
θm,n: beam scanning angle in direction of elevation angle Furthermore, the digital transmission signal generated in the waveform generator A2 is converted in the DA converter A3, into an analog signal, which is fed to the transmission signal mixer A4. In the clock generator A1, a local signal of 9.6 GHz synchronous with the lower digital clock signal of 10 MHz is generated from the higher digital clock signal of 600 MHz and the lower digital clock signal of 10 MHz which are supplied from the signal source 15, and is output to the transmission signal mixer A4. In the transmission signal mixer A4, the analog transmission signal fed from the DA converter A3 and the local signal of 9.6 GHz generated in the clock generator A1 are mixed to generate a transmission micro wave signal. The transmission micro wave signal thus generated has an unnecessary component removed therefrom by the filter A5 and subjected to power amplification by the transmission power amplifier A6, and then fed to the antenna element 11*n* and transmitted to air space.

By variably controlling the above-described phase delay amount Pm,n for each antenna element, at each time, the invention can be used as a phased array capable of electronically scanning the beam.

Next, inputting the digital clock signal of 600 MHz generated in the signal source 15 to execute the receiving operation in the band of 9.6 GHz will be explained.

The reception micro wave signal input from the antenna element 11*n* is subjected to low heat noise amplification at the low noise amplifier A7 of the receiving side and is input to the reception signal mixer A8. In the reception mixer A8, the reception micro wave signal is converted into a reception IF signal of approximately 150 MHz, with the local signal of 9.6 GHz generated in the clock generator A1, in the same manner as that at the transmission. The signal converted into the reception IF signal in the reception mixer A7 is converted in the AD converter A9, into a digital signal, which is output to the beam former 13.

In the above-constituted transceiver module 12*n*, in this invention, the micro wave analog signal interface is provided between the transceiver module and the antenna element 11*n*, and all the signal interfaces except the power supply are digital signal interfaces, and the interfaces are configured as one chip on a semiconductor.

In addition, in the transceiver module 12*n*, an internal reference signal generates a local signal serving as a reference by multiplying a high frequency digital clock signal supplied from the outside, and simultaneously generates a reference signal capable of synchronous operation by a lower frequency digital clock signal supplied from the outside, in the clock generator A1.

In the clock generator A1, the frequency of the generated reference local signal can be varied by controlling the inner multiplication number or the frequency of the higher frequency digital clock signal supplied from the outside. In addition, both transmission and reception can be executed with an arbitrary frequency by varying the frequency of the transmission digital signal generated in the transmission waveform generator A2.

If an output unit of the AD converter A3 for converting the analog signal into the digital signal is provided with the interface circuit unit A10 for executing a high-speed large-capacity data transmission to the outside, in the transceiver module, in 12n, the invention can also be used for a micro wave communication device.

In addition, it is expected that if an output unit of the AD converter A8 is provided with a circuit for inputting the reception digital signal output from the other transceiver module and executing complex multiplication, a phased array which is active by mutually adjusting the outputs of the respective antenna elements can be implemented.

As described above, a small, lightweight and cheap active phased array antenna can be implemented according to the structure of the invention. In particular, highly-functional and high-performance system can be provided for various radio wave communication devices such as radars and communication devices.

Figure 2:
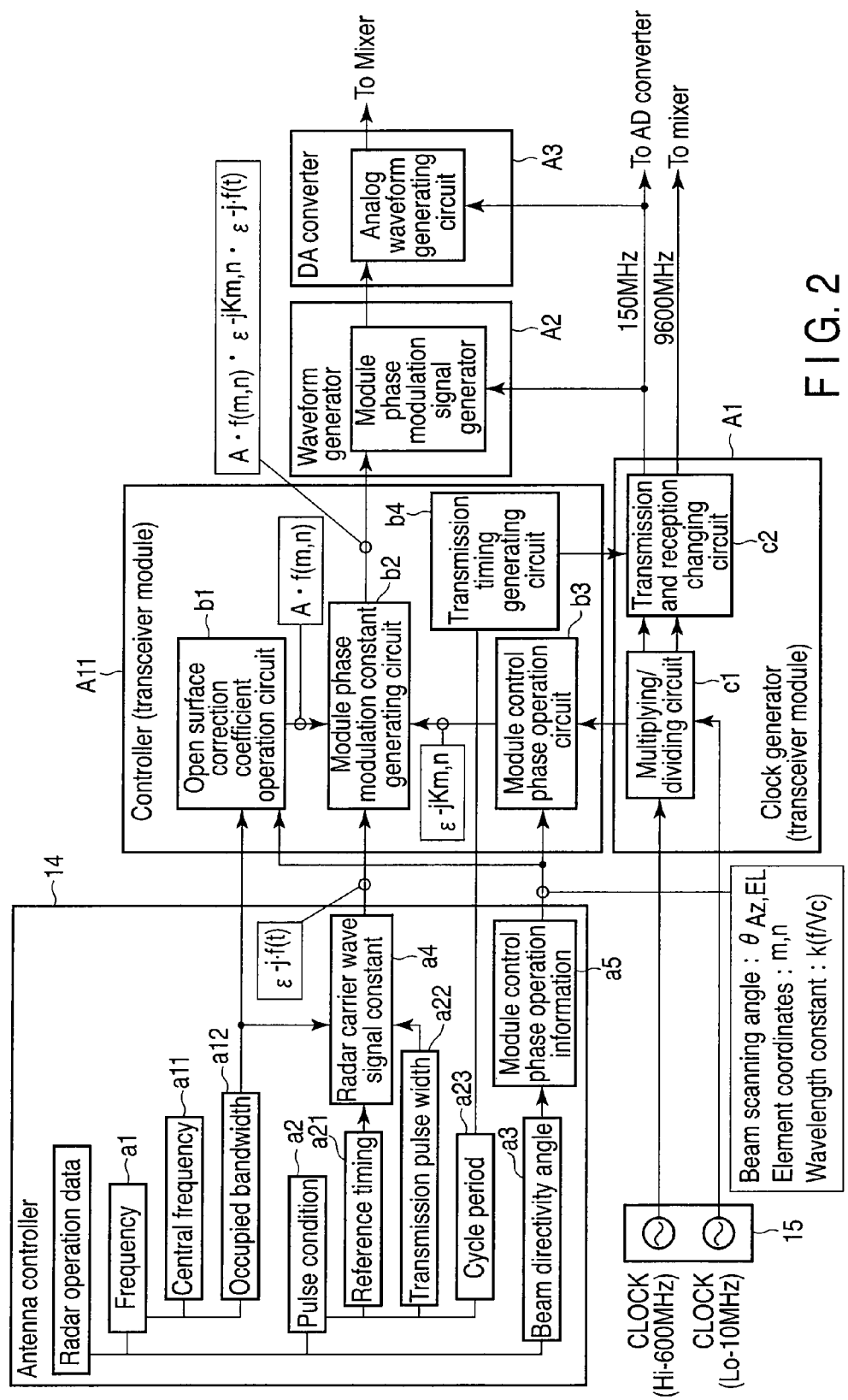
FIG. 2 is a block diagram showing a structure of a control system in the micro wave array antenna apparatus.

As a concrete example, FIG. 2 shows a flow of processing in a case where the invention is applied to an array antenna apparatus of a pulse radar apparatus. In FIG. 2, a frequency a1, a pulse condition a2, and a beam directivity angle a3 are determined as radar operation data, in the antenna controller 14. As the frequency a1, a central frequency a11 and an occupied bandwidth a12 are set. As the pulse condition a2, a reference timing a21, a transmission pulse width a22 and a cycle period a23 are set. Then, a radar carrier wave signal constant ($\epsilon^{-jf(t)}$) a4 is generated from the set values of the occupied bandwidth a12, the reference timing a21, and the transmission pulse width a22. When the beam directivity angle a3 is set, beam scanning angles $\theta_{AZ,EL}$, element coordinates (m, n) and a wavelength constant k(f/Vc) are obtained from the beam directivity angle a3 as information a5 required for a phase operation of the module control, and are fed to the controller A11 of the transceiver module 12n together with the occupied bandwidth a12 and the radar carrier wave signal constant a4.

In the controller A11, the occupied bandwidth a12 supplied from the antenna controller 14 is supplied to an open surface correction coefficient operation circuit b1, the radar carrier wave signal constant a4 is fed to a module phase modulation constant generating circuit b2, and the module control phase operation information a5 is fed to the open surface correction coefficient operation circuit b1 and also to a module control phase operation circuit b3.

The open surface correction coefficient operation circuit b1 obtains a correction coefficient A·f(m,n) of the antenna open surface from the occupied bandwidth a12 and the module control phase operation information a5. On the other hand, the module control phase operation circuit b3 obtains a module control phase $\epsilon^{-jKm,n}$ from the module control phase operation information a5 on the basis of the digital clock signal supplied from multiplying/dividing circuit c1 of the clock generator A1.

The module phase modulation constant generating circuit b2 generates a module phase modulation constant A·f(m,n)·$\epsilon^{-jKm}$,n·$\epsilon^{-jf(t)}$ from the open surface correction coefficient A·f(m,n), the module control phase $\epsilon^{-jKm}$,n and the radar carrier wave signal constant $\epsilon^{-jf(t)}$.

On the other hand, the cycle period a23 supplied from the antenna controller 14 is supplied to a transmission timing generating circuit b4. The transmission timing generating circuit b4 generates a timing signal for controlling switching of the transmission and reception from the cycle period a23 of the transmission pulse. The timing signal generated in the transmission timing generating circuit b4 is supplied to a transmission and reception changing circuit c2 of the clock generator A1.

In the clock generator A1, the lower digital clock signal (10 MHz) and the higher digital clock signal (600 MHz) supplied from the signal source 15 are input, and both the clock signals are multiplied/divided to generate clock signals of 9600 MHz and 150 MHz, in the multiplying/dividing circuit c1. The clock signals thus generated are selectively derived at timings of respective transmission and reception of the radar pulse by the transmission and reception changing circuit c2. The clock signal of 150 MHz is supplied to the waveform generator A2 and to the DA converter A3 and the AD converter A9 as a sampling block. The clock signal of 9600 MHz is fed to the mixers A4, A8 as a local signal.

On the other hand, the module phase modulation constant generated in the module phase modulation constant generating circuit b2 is fed to the waveform generator A2. The waveform generator A2 generates a module phase modulation signal based on the module phase modulation constant at a step using the clock signal of 150 MHz. The modulation signal obtained here is fed to the DA converter A3, and is converted on the basis of the clock signal of 150 MHz, into an analog waveform, which is fed to the mixer A4.

According to the above-described structure, since all the signal interfaces other than the power supply, i.e., in the controller A11, are digital signal interfaces, they can be configured as one chip on a semiconductor.

In addition, inside the module, the local signal serving as a reference can be generated by multiplying the higher frequency digital clock signal and, at the same time, the reference signal capable of synchronous operation can be generated by the lower frequency digital clock signal, in the clock generator A1.

In the clock generator A1, the frequency of the generated reference local signal can be varied by controlling the inner multiplication number or the frequency of higher frequency digital clock signal. In addition, transmission and reception can be executed with an arbitrary frequency by varying the frequency of the transmission digital signal generated in the transmission waveform generator A2.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily. For example, even if some of all the constituent elements described in the embodiment are deleted, the problem described in the problem to be solved by the invention can be solved. If the advantage described in the advantage of the invention can be obtained, the structure having the constituent elements deleted therefrom can be extracted as the invention.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An array antenna apparatus for use in a radar apparatus, comprising:
    a plurality of antenna elements;
    a plurality of micro wave transceiver modules connected to the plurality of antenna elements, respectively, each having a function of generating a transmission micro wave signal based on a designated transmission timing and a transmission parameter, and supplying the transmission micro wave signal to each of the antenna elements and a function of receiving micro wave signals from the antenna elements;
    a beam former configured to perform phase control and synthesize reception signals output from the plurality of micro wave transceiver modules; and
    an antenna controller configured to generate a control signal to each of the plurality of micro wave transceiver modules and the beam former,
    wherein each of the micro wave transceiver modules comprises an interface for inputting/outputting a micro wave analog signal to/from the antenna element, and all of signal interfaces are configured as one chip on a semiconductor; and
    the antenna controller performs control for designating the transmission timing and the transmission parameter for each of the micro wave transceiver modules based on a designated beam directivity angle, to enable the beam former to control phases of the reception signals.

2. The apparatus of claim 1, wherein each of the micro wave transceiver modules comprises:
    a waveform generator capable of generating different transmission waveforms for the respective antenna elements;
    a clock multiplier configured to generate a reference local signal by multiplying a higher frequency digital clock signal, and generate a reference signal for synchronization from a lower frequency digital clock signal;
    a digital signal-analog signal (DA) converter configured to convert the digital transmission signal generated in the waveform generator into an analog signal;
    a transmission signal mixer configured to mix the higher frequency reference local signal generated in the clock multiplier with the analog transmission signal generated in the DA converter and generate a micro wave transmission signal;
    a transmission power amplifier configured to execute power amplification for the transmission signal frequency-converted in the mixer and transmit the transmission signal to the antenna element;
    a reception power amplifier configured to execute low heat noise amplification for the reception micro wave signal input from the antenna element;
    a reception signal mixer configured to mix the reference local signal generated in the clock multiplier with the micro wave reception signal output from the reception power amplifier, and generate a reception intermediate frequency signal;
    an analog signal-digital signal (AD) converter configured to convert the analog signal of the reception intermediate frequency signal generated in the reception signal mixer, into a digital signal, with the reference local signal generated in the clock multiplier; and
    a module controller configured to control at least the digital waveform generator and the clock multiplier in accordance with the transmission timing and the transmission parameter from the antenna controller.

3. The apparatus of claim 2, wherein the module controller varies a frequency of the generated reference local signal by controlling a multiplication number inside the clock multiplier or a frequency of the higher frequency digital clock signal, and execute transmission and reception with an arbitrary frequency by varying a frequency of the digital transmission signal generated in the transmission waveform generator.

4. The apparatus of claim 2, wherein the micro wave transceiver module comprises a signal interface circuit unit configured to execute data communication to the outside, in an output unit of the AD converter.

5. The apparatus of claim 2, wherein the micro wave transceiver module comprises a circuit configured to execute a complex multiplication by inputting a digital reception signal output from another micro wave transceiver module, in an output unit of the AD converter.

6. The apparatus of claim 2, wherein the micro wave transceiver module comprises a circuit configured to execute a complex multiplication based on a digital reception signal output from another micro wave transceiver module, and a signal interface circuit unit configured to execute data communication to the outside, in an output unit of the AD converter.

7. A micro wave transceiver module used for a radar apparatus and connected to each of a plurality of antenna elements, generating a micro wave signal, supplying transmission a micro wave signal to the antenna element and receiving a micro wave signal from the antenna element, the micro wave transceiver module comprising:
    a waveform generator capable of generating different transmission waveforms for the respective antenna elements;
    a clock multiplier configured to generate a reference local signal by multiplying a higher frequency digital clock signal, and generate a reference signal for synchronization from a lower frequency digital clock signal;
    a digital signal-analog signal (DA) converter configured to convert the digital transmission signal generated in the waveform generator into an analog signal;
    a transmission signal mixer configured to mix the higher frequency reference local signal generated in the clock multiplier with the analog transmission signal generated in the DA converter and generate a micro wave transmission signal;
    a transmission power amplifier configured to execute power amplification for the transmission signal frequency-converted in the mixer and transmit the transmission signal to the antenna element;
    a reception power amplifier configured to execute low heat noise amplification for the reception micro wave signal input from the antenna element;
    a reception signal mixer configured to mix the reference local signal generated in the clock multiplier with the micro wave reception signal output from the reception power amplifier, and generate a reception intermediate frequency signal;
    an analog signal-digital signal (AD) converter configured to convert the analog signal of the reception intermediate frequency signal generated in the reception signal mixer, into a digital signal, with the reference local signal generated in the clock multiplier; and a module controller configured to control at least the digital waveform generator and the clock multiplier in accordance with a transmission timing and a transmission parameter supplied based on a beam directivity angle, wherein the micro wave transceiver module comprises an interface for inputting/outputting a micro wave analog signal to/from the antenna element, and all of signal interfaces are configured as one chip on a semiconductor.

8. The module of claim 7, wherein the module controller varies a frequency of the generated reference local signal by controlling a multiplication number inside the clock multiplier or a frequency of the higher frequency digital clock signal, and execute transmission and reception with an arbitrary frequency by varying a frequency of the digital transmission signal generated in the transmission waveform generator.

9. The module of claim 7, further comprising a signal interface circuit unit configured to execute data communication to the outside, in an output unit of the AD converter.

10. The module of claim 7, further comprising a circuit configured to execute a complex multiplication based on a digital reception signal output from another micro wave transceiver module, in an output unit of the AD converter.

11. The module of claim 7, further comprising a circuit configured to execute a complex multiplication based on a digital reception signal output from another micro wave transceiver module, and a signal interface circuit unit configured to execute data communication to the outside, in an output unit of the AD converter.

12. A micro wave transceiver module, connected to each of a plurality of antenna elements, supplying transmission a micro wave signal to the antenna element and receiving a micro wave signal from the antenna element, the micro wave transceiver module comprising:

a waveform generator capable of generating different transmission waveforms for the respective antenna elements;

a clock multiplier configured to generate a reference local signal by multiplying a higher frequency digital clock signal, and generate a reference signal for synchronization from a lower frequency digital clock signal;

a digital signal-analog signal (DA) converter configured to convert the digital transmission signal generated in the waveform generator into an analog signal;

a transmission signal mixer configured to mix the higher frequency reference local signal generated in the clock multiplier with the analog transmission signal generated in the DA converter and generate a micro wave transmission signal;

a transmission power amplifier configured to execute power amplification for the transmission signal frequency-converted in the mixer and transmit the transmission signal to the antenna element;

a reception power amplifier configured to execute low heat noise amplification for the reception micro wave signal input from the antenna element;

a reception signal mixer configured to mix the reference local signal generated in the clock multiplier with the micro wave reception signal output from the reception power amplifier, and generate a reception intermediate frequency signal;

an analog signal-digital signal (AD) converter configured to convert the analog signal of the reception intermediate frequency signal generated in the reception signal mixer, into a digital signal, with the reference local signal generated in the clock multiplier; and a module controller configured to control at least the digital waveform generator and the clock multiplier in accordance with directions from outside, a circuit configured to execute a complex multiplication based on a digital reception signal output from another micro wave transceiver module, in an output unit of the AD converter wherein the micro wave transceiver module comprises an interface for inputting/outputting a micro wave analog signal to/from the antenna element, and all of signal interfaces except a power supply are digital signal interfaces and are configured as one chip on a semiconductor.

13. The module of claim 12, further comprising a signal interface circuit unit configured to execute data communication to the outside, in an output unit of the AD converter.

* * * * *